June 5, 1945. A. L. PRENTICE 2,377,372
DEVICE FOR ELIMINATING WEAR ON BRAKE SHOE HEADS
Filed Nov. 9, 1942 2 Sheets-Sheet 2
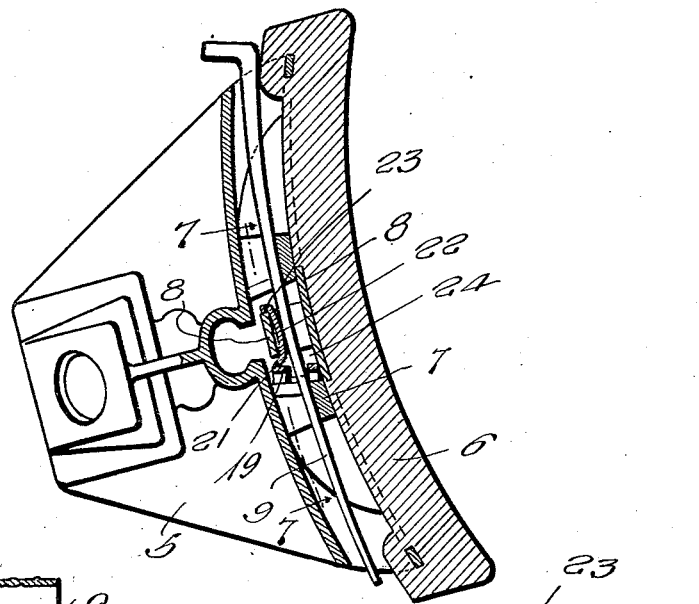
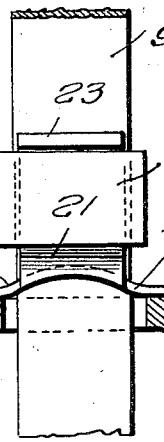
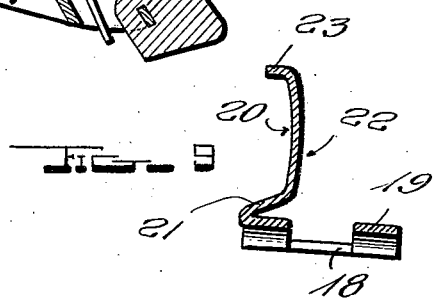
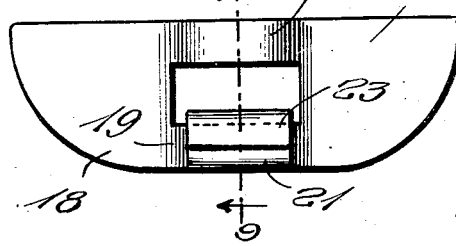
INVENTOR.
ALLAN L. PRENTICE,
BY
Lacey & Lacey
Attorneys Patented June 5, 1945

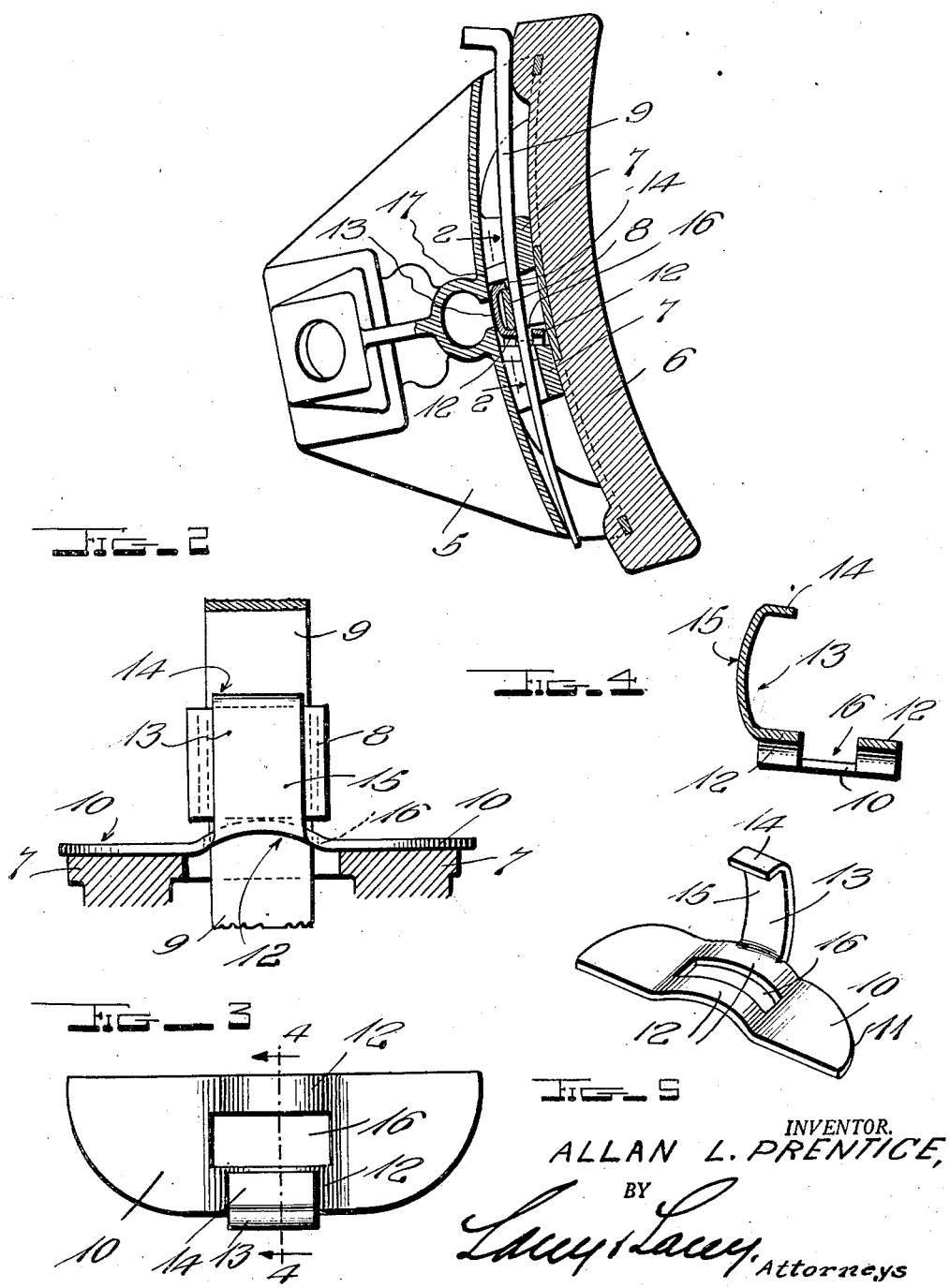

2,377,372

UNITED STATES PATENT OFFICE 2,377,372

DEVICE FOR ELIMINATING WEAR ON BRAKE SHOE HEADS

Allan L. Prentice, Cleveland, Ohio, assignor of fifty per cent to Joseph L. Ortner, Cincinnati, Ohio Application November 9, 1942, Serial No. 465,020

8 Claims. (Cl. 188—236)

This invention relates to brake shoes for railway cars and more particularly to means for preventing vibration between the brake shoe and brake shoe head thereby to eliminate wear on said brake shoe head.

The object of the invention is to provide a wear plate or key adapted to fit between the supporting lugs of the brake shoe and brake shoe head respectively and provided with an upwardly bowed resilient portion resting on the upper face of the lower supporting lug of said brake shoe head and yieldably engaging the brake shoe lug so as to maintain the parts under tension at all times and thus prevent wear on the brake shoe head and materially increase the effective service life thereof.

A further object of the invention is to provide a wear plate or key having a slot formed in the upwardly bowed portion thereof to permit the passage of a brake shoe locking pin and provided with an upstanding finger terminating in an angular lip fitting over the brake shoe supporting lug, the intermediate portion of the finger being curved laterally for yieldable engagement with the brake shoe head to assist in preventing vibration between the parts.

A further object is to provide a wear plate or key which can be used with slight structural alterations either on new brake shoes and heads or on brake shoe heads that have become worn from constant use.

A still further object of the invention is generally to improve this class of devices so as to increase their utility, durability and efficiency.

In the accompanying drawings forming a part of this specification and in which similar numerals of reference indicate corresponding parts in all the figures of the drawings:

Figure 1 is a vertical sectional view of a standard brake shoe head and shoe showing the improved wear plate or key in position thereon, Figure 2 is a transverse sectional view taken substantially on the line 2—2 of Figure 1, Figure 3 is a top plan view of the wear plate or key detached, Figure 4 is a transverse sectional view taken on the line 4—4 of Figure 3, Figure 5 is a perspective view of the wear plate or key, Figure 6 is a vertical sectional view showing the type of wear plate or key used on worn brake shoe heads, Figure 7 is a transverse sectional view taken substantially on the line 7—7 of Figure 6.

Figure 8 is a top plan view of the wear plate or key shown in Figure 6 detached, Figure 9 is a transverse sectional view taken on the line 9—9 of Figure 8, and Figure 10 is a perspective view of the modified form of wear plate or key.

The improved wear plate or key forming the subject-matter of the present invention may be used in connection with any style or type of brake shoe, and in Figure 1 of the drawings is shown applied to a brake shoe head and shoe of standard construction and indicated at 5 and 6, respectively.

The brake shoe head 5 is provided with spaced upper and lower supporting lugs 7, between which is interposed the supporting lug 8 of the brake shoe 6, the parts being secured in assembled position by means of a locking key 9.

In order to prevent excessive vibration between the opposing faces of the supporting lugs of the brake shoe head and shoe and consequent wear thereon, I provide a resilient wear plate or key of the construction shown in Figure 5 of the drawings. This wear plate or key is preferably formed of spring metal and comprises a base plate 10, the opposite ends of which are curved at 11 and adapted to rest on the upper surface of the lower supporting lug 7 of the brake shoe head. The intermediate portion of the plate 10 is bent upwardly to form a resilient bowed portion 12 which yieldably engages the lower face of the brake shoe supporting lug 8 and serves to exert a constant upward pressure thereon, thereby to prevent wear on the supporting lugs of the brake shoe head and consequently increase the effective service life of said brake shoe head.

Secured to or formed integral with the plate 10 and extending upwardly therefrom at one side of the intermediate bowed portion 12 is a finger 13 terminating in an inwardly extending lip 14 adapted to bear against the upper edge of the supporting lug of the brake shoe and hold the device in proper position thereon. The upstanding finger 13 is preferably curved or bowed laterally to provide an intermediate resilient portion 15 which bears against the adjacent concave face of the head 5 and serves to further assist in preventing vibration between the head and brake shoe.

The upwardly curved portion 12 of the plate 10 is formed with a slot 16 adapted to receive the locking key 9 so that the locking key may be employed in the usual manner. It will here be noted that the end of the angular lip 14 terminates short of the inner face of the rear wall of the brake shoe supporting lug 8 so as not to interfere with the insertion or removal of the locking key. Inasmuch as the opposite ends of the plate 10 rest against the lower supporting lugs of the brake shoe head, accidental lateral tilting of the wear plate or key is effectively prevented while at the same time the upwardly bowed intermediate portion 12 of the plate 10 and the outwardly bowed intermediate portion 15 of the finger 13 by yieldable engagement with the supporting lug 8 and inner concave face 17 of the brake shoe head serve to prevent vibration between the parts and consequent wear thereon which often necessitates renewal of either the brake shoe head or shoe or both after a short period of service.

The wear plate or key just described is especially designed for use on new brake shoe heads, and in Figures 6 to 10 inclusive there is illustrated a modified form of the invention adapted for use in connection with worn heads or shoes to permit the continued use thereof without vibration between the parts. In this form of the device, the base plate 18 is similar in construction to the base plate 10 and is provided with an upwardly bowed slotted portion 19 corresponding to the slotted portion 12. The base of the upstanding finger 20, however, is bent inwardly over the bowed portion 19, as indicated at 21, to form a contact shoulder and thence extended upwardly so as to fit in front of the rear portion of the supporting lug of the brake shoe instead of at the rear thereof as in Figure 1 of the drawings. The intermediate portion of the finger 20 is also preferably slightly bowed outwardly, as indicated at 22, and adapted to yieldingly engage the locking key to assist in preventing accidental displacement thereof, said finger being provided with a terminal angular lip 23 which fits over the supporting lug 8, as shown.

As the device shown in Figure 6 is for use on worn brake shoe heads, a space, indicated at 24, has been shown, between the lower end of the shoe supporting lug and the adjacent supporting lug of the brake head, to indicate the amount of wear on the parts incident to continued active service. The wear plate is shown positioned in said space with the plate 18 resting on the lower supporting lug of the brake head, and in which position the inwardly extending stop shoulder 21 by engagement with the lower edge of the shoe supporting lug 8, will prevent vibration between the parts while at the same time the bowed portion 22 of the finger 20 will yieldably engage the locking key and hold the latter against accidental displacement thereby eliminating further wear on the supporting lugs of both the brake head and shoe.

The device is very simple in construction and can be quickly applied to standard brakes of railway cars without necessitating any structural changes therein and when thus applied will eliminate all wear on the supporting lugs and consequently materially increase the effective life of the brake shoe head.

It will, of course, be understood that the devices may be made in different sizes and shapes and constructed of any suitable material without departing from the spirit of the invention.

Having thus described the invention, what is claimed as new is:

1. The combination with a brake head and shoe having interfitting supporting lugs, of a wear take-up device comprising an elongated plate disposed between the opposing faces of the lugs and having its central portion provided intermediate its width with a longitudinal slot defining spaced continuous upwardly bowed portions forming a yieldable cushion engaging one of said opposing faces and an upstanding laterally bowed resilient finger yieldably engaging the adjacent vertically extending face of the brake head.

2. The combination with a brake head and shoe having interfitting supporting lugs and a locking key extending through said lugs, of a wear take-up device disposed between the opposing faces of the lugs and comprising a plate having its central portion intermediate its width slotted for the reception of the locking key and defining spaced upwardly bowed continuous portions forming a cushioning member engaging one of said opposing faces, said plate at one side of the bowed portion thereof being provided with an upstanding finger fixed at its lower end to the said bowed portion and having its upper end free and terminating in an angular lip adapted to engage over and grip the upper end of the supporting lug of the shoe.

3. The combination with a brake head and shoe having interfitting supporting lugs and a locking key extending through said lugs, of a wear take-up device disposed between the opposing faces of the lugs and comprising a plate having its opposite ends flat and its central portion slotted longitudinally intermediate its width to form spaced continuous upwardly bowed portions forming a resilient cushioning member engaging one of said opposing faces, said plate at one side of the intermediate bowed portion thereof being provided with an upstanding laterally curved finger having its lower end integral with said bowed portion and its upper end free and terminating in an angular lip adapted to engage over and grip the upper end of the supporting lug of the shoe.

4. A wear take-up device for brake shoes comprising an elongated plate having its opposite ends provided with portions for engagement with the lower supporting lugs of a brake beam head and its rear edge at said portions curved in the direction of the front edge of the plate, the intermediate portion of the plate being slotted and bowed upwardly to form a resilient contact member, and an outwardly bowed finger projecting upwardly from the slotted portion of the plate and having its upper end free and provided with a terminal angularly disposed lip.

5. A wear take-up device for brake shoes comprising a plate having its intermediate portion slotted and bowed upwardly to form a resilient horizontally disposed contact member, and a finger fixedly carried by and projecting upwardly from one side of the plate at said bowed portion and having its upper end free and terminating in an angularly disposed lip, the intermediate portion of the finger being bowed laterally to form a resilient vertically disposed contact member for yieldably bearing against and frictionally gripping the vertical face of a brake head.

6. A wear take-up device for brake shoes comprising a plate having its intermediate portions slotted and bowed upwardly to form a central resilient member, and a finger projecting upwardly from one side of the plate and having its lower end bent inwardly over the bowed portion to form a stop shoulder and thence continued upwardly and having its upper end free and terminating in an angularly disposed lip to engage over the lug of a brake shoe and grip the same to hold the device in engagement with the lug of the shoe.

7. The combination with a brake head and shoe having interfitting supporting lugs, of a wear take-up device comprising an elongated plate disposed between the opposing faces of the lugs and having its central portion provided intermediate its width with a longitudinal slot defining spaced continuous upwardly bowed portions forming a yieldable cushion engaging one of said opposing faces, and a finger extending upwardly from the bowed portion for passing through a lug of a shoe and frictionally gripping a key to prevent longitudinal displacement of the key.

8. A wear take-up device for brake shoes comprising an elongated plate having mounting portions and an upwardly bowed portion between the mounting portions provided intermediate its width with a longitudinal slot defining spaced continuous upwardly bowed portions integral with the mounting portions and forming a yieldable cushioning member, and a tongue extending upwardly from the bowed portion for passing through a brake shoe lug and curved longitudinally for applying gripping engagement with a side face of a brake shoe lug.

ALLAN L. PRENTICE.